(12) United States Patent
Keohane et al.

(10) Patent No.: US 7,480,855 B2
(45) Date of Patent: Jan. 20, 2009

(54) APPARATUS AND METHOD OF HIGHLIGHTING PARTS OF WEB DOCUMENTS BASED ON INTENDED READERS

(75) Inventors: Susann Marie Keohane, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1300 days.

(21) Appl. No.: 09/998,396

(22) Filed: Nov. 15, 2001

(65) Prior Publication Data

US 2004/0205631 A1    Oct. 14, 2004

(51) Int. Cl.
*G06N 3/00* (2006.01)
(52) U.S. Cl. .................................... 715/234
(58) Field of Classification Search ............... 715/526, 715/501.1, 513, 517, 234, 243, 254, 255
See application file for complete search history.

(56) References Cited

U.S. PATENT DOCUMENTS 6,204,873 B1 * 3/2001 Shimazaki .................. 347/172
6,577,291 B2 * 6/2003 Hill et al. ...................... 345/89
2001/0030668 A1 * 10/2001 Erten et al. .................. 345/863
2003/0001891 A1 * 1/2003 Keohane et al. ............. 345/754

OTHER PUBLICATIONS

Figures 1-5 created with Microsoft(r) Word(r) 2000, screenshots, 1999.*
Microsoft(r) Word(r) Screenshots, Figures 6-7.*
"Adobe GoLive 5.0 User Guide," Adobe Systems Incorporated, 2000, pp. 109-110.*

* cited by examiner

*Primary Examiner*—Stephen S Hong
*Assistant Examiner*—Kyle R Stork
(74) *Attorney, Agent, or Firm*—Volel Emile; Diana R. Gerhardt; Mark McBurney

(57) ABSTRACT

An apparatus and method of highlighting a section of an HTML document based on who accesses the document are provided. When the document is accessed and displayed, a plurality of button associated each with a different part of the document is also displayed. When one of the buttons is asserted, the section of the document with which it is associated is highlighted.

12 Claims, 10 Drawing Sheets

---

```
<HUMAN RESOURCE TARGET> <TECHNICAL MANAGER>
OUR <FACILITY MANAGER TARGET> NEW
EMPLOYEE </FACILITY MANAGER TARGET> , SARA SMITH, IS
<FACILITY MANAGER TARGET>SCHEDULED TO START
10/30/2001. </FACILITY MANAGER TARGET></TECHNICAL
MANAGER>HER EMPLOYEE CONTRACT NEEDS TO BE READY
FOR SIGNATURE ON HER START DATE. PAYROLL SHOULD BE
NOTIFIED OF HER EMPLOYEE INFORMATION, START DATE
AND SALARY. </HUMAN RESOURCE TARGET><FACILITY
MANAGER TARGET>SHE WILL NEED TO BE ASSIGNED AN
OFFICE ON THE FIRST FLOOR OF BUILDING B. THE OFFICE
SHOULD BE WIRED FOR ETHERNET AND HAVE A PC WITH A
19 INCH MONITOR. </FACILITY MANAGER TARGET><TECHNICAL
MANAGER>SHE IS TO ASSIGNED TO THE NEW TECHNOLOGY
AREA WORKING ON STARSHIP PROJECT IN THE DEVICE DRIVER
TEAM. </TECHNICAL MANAGER> <HUMAN RESOURCE
TARGET>INFORMATION FOR HER RELOCATION SHOULD BE
SENT TO HER ASAP.</HUMAN RESOURCE TARGET>
```

<HUMAN RESOURCE TARGET> <TECHNICAL MANAGER> OUR <FACILITY MANAGER TARGET> NEW EMPLOYEE </FACILITY MANAGER TARGET> , SARA SMITH, IS <FACILITY MANAGER TARGET>SCHEDULED TO START 10/30/2001. </FACILITY MANAGER TARGET></TECHNICAL MANAGER>HER EMPLOYEE CONTRACT NEEDS TO BE READY FOR SIGNATURE ON HER START DATE. PAYROLL SHOULD BE NOTIFIED OF HER EMPLOYEE INFORMATION, START DATE AND SALARY. </HUMAN RESOURCE TARGET><FACILITY MANAGER TARGET>SHE WILL NEED TO BE ASSIGNED AN OFFICE ON THE FIRST FLOOR OF BUILDING B. THE OFFICE SHOULD BE WIRED FOR ETHERNET AND HAVE A PC WITH A 19 INCH MONITOR. </FACILITY MANAGER TARGET><TECHNICAL MANAGER>SHE IS TO ASSIGNED TO THE NEW TECHNOLOGY AREA WORKING ON STARSHIP PROJECT IN THE DEVICE DRIVER TEAM. </TECHNICAL MANAGER> <HUMAN RESOURCE TARGET>INFORMATION FOR HER RELOCATION SHOULD BE SENT TO HER ASAP.</HUMAN RESOURCE TARGET>

FIG. 5E

APPARATUS AND METHOD OF HIGHLIGHTING PARTS OF WEB DOCUMENTS BASED ON INTENDED READERS

BACKGROUND OF THE INVENTION

1. Technical Field

The present invention is directed to an apparatus and method of managing HTML documents. More specifically, the present invention is directed to an apparatus and method of highlighting certain parts of an HTML document based on an intended reader.

2. Description of Related Art

The Internet or the World Wide Web (WWW) has become a very convenient and inexpensive resource for finding information about nearly every subject imaginable. Users can shop for merchandise, get stock quotes, tune into radio programs, chat with other users and engage in a host of other activities. The ever-increasing use of the Internet has been facilitated by the widespread availability of computer programs called Web browsers. A Web browser is a program that is used for establishing communication between two computers on a network using the hypertext transfer protocol (HTTP).

In a typical transaction, a web browser transmits a request to download a document indicated by an address called a uniform resource locator (URL). The download request is routed through the Web until it reaches a web server indicated by the URL. The web server responds to the request by transmitting the indicated document, commonly called a "Web page," back to the requesting computer.

Web pages are usually written using the hypertext mark up language (HTML) and often include links to other objects. For example, a web page may include links to one or more graphics objects that are to be downloaded and displayed with the web page. A web page may also include links to program code (e.g., Java code) that is to be downloaded and executed on the client computer when the web page is displayed. The downloaded code may be used to create a more interactive presentation, for example, by animating portions of the web page or by prompting for user input. A web page may also include pointers to plug-in modules that are expected to be resident in the client computer. Such program modules are commonly referred to as "plug-ins" and are generally used to extend the capabilities of the web browser. For example, a plug-in may be invoked to generate audio output, perform file translation and so forth.

With such ubiquitous use, it is not any surprise that document reviews are also conducted over the Internet. Presently, when a user desires to have a document reviewed over the Internet, the user has to post the document on a Web site. Then, the user has to send a note, electronic or otherwise, to the prospective reviewers detailing the address of the Web site where the document is posted. If the user wishes to have particular reviewers reviewing particular topics or sections of the document, the user has to so indicate in the note. Alternatively, the user may specify in the document itself what section each reviewer is to review.

Sometimes, instead of specifying in the document itself what section each reviewer is to review, the user creates as many copies of the document as there are different reviewers reviewing different sections. Each copy of the document is posted at a different Web site. The user then ensures that sections of a copy to be reviewed by a reviewer or reviewers blink when the copy is accessed indicating to the reviewer that only those sections need to be reviewed. This can be a rather daunting task. Imagine having fifty different sections to be reviewed. The user then has to make fifty copies, posting each copy at a different Web site and having the appropriate section blink when the document is accessed.

Thus, what is needed is an apparatus and method of using only one copy of a document and of highlighting particular sections of the document based on the reviewer.

SUMMARY OF THE INVENTION

The present invention provides an apparatus and method of highlighting a section of an HTML document based on who accesses the document. When the document is accessed and displayed, a plurality of button associated each with a different part of the document is also displayed. When one of the buttons is asserted, the section of the document with which it is associated is highlighted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
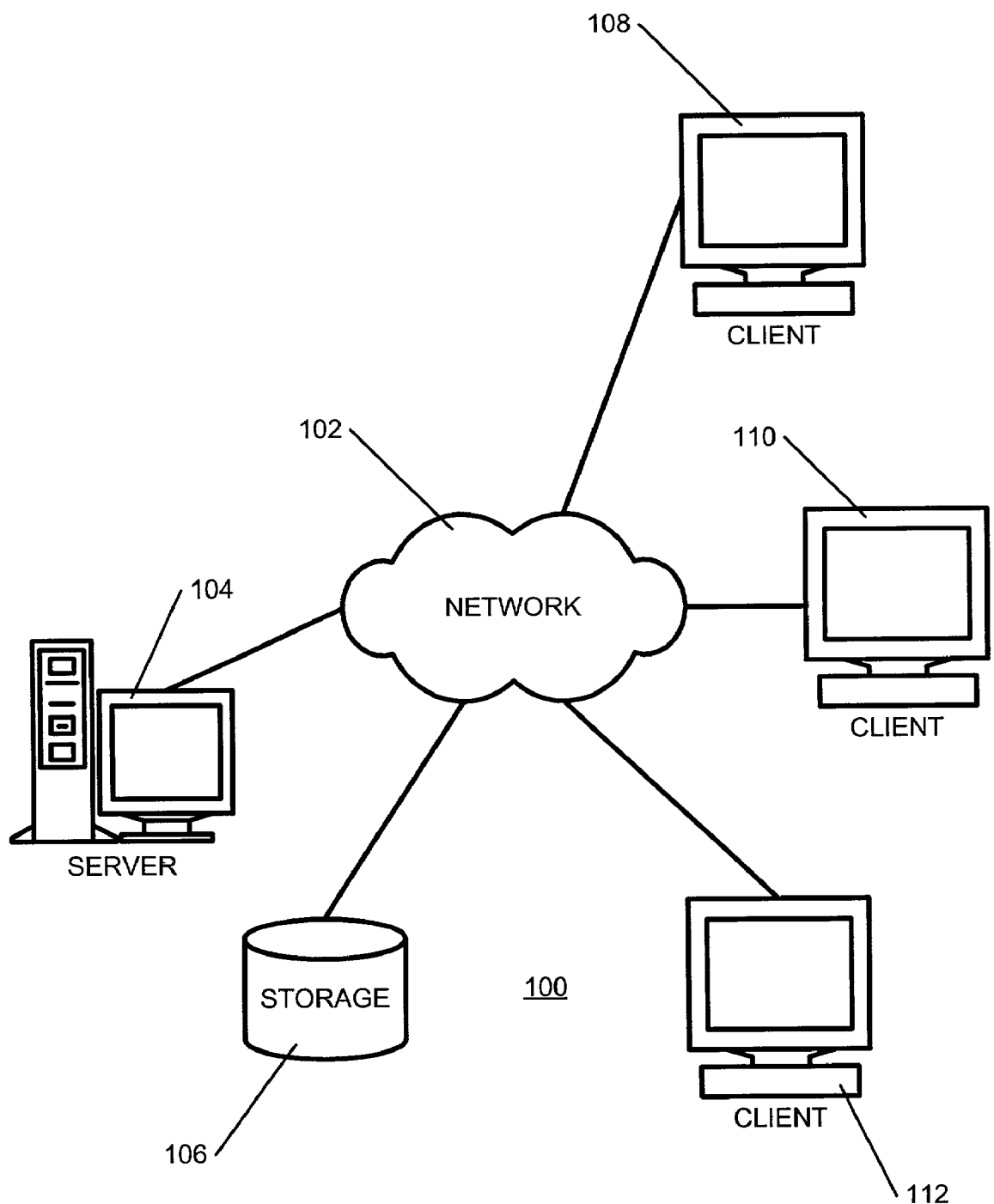
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
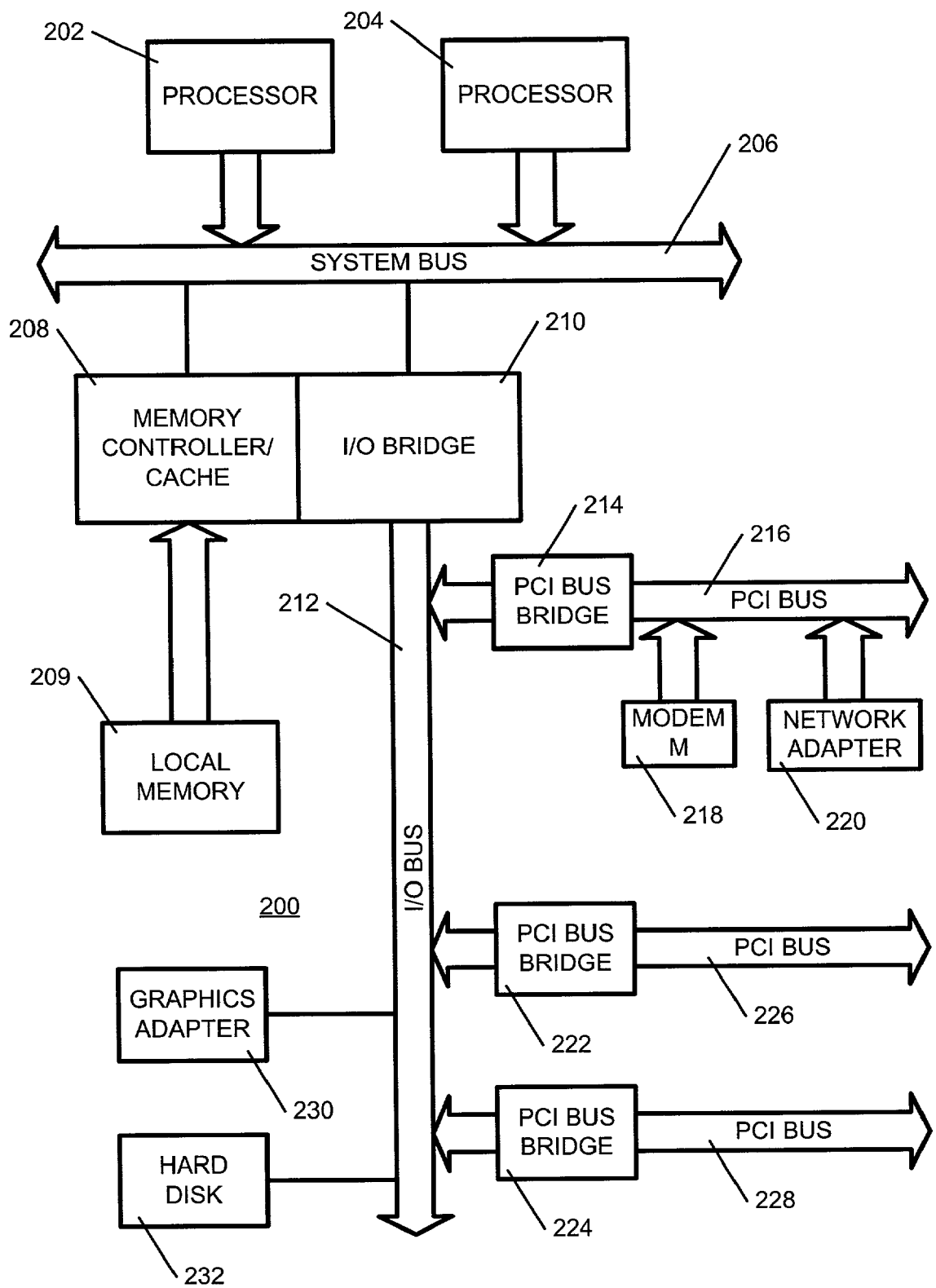
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
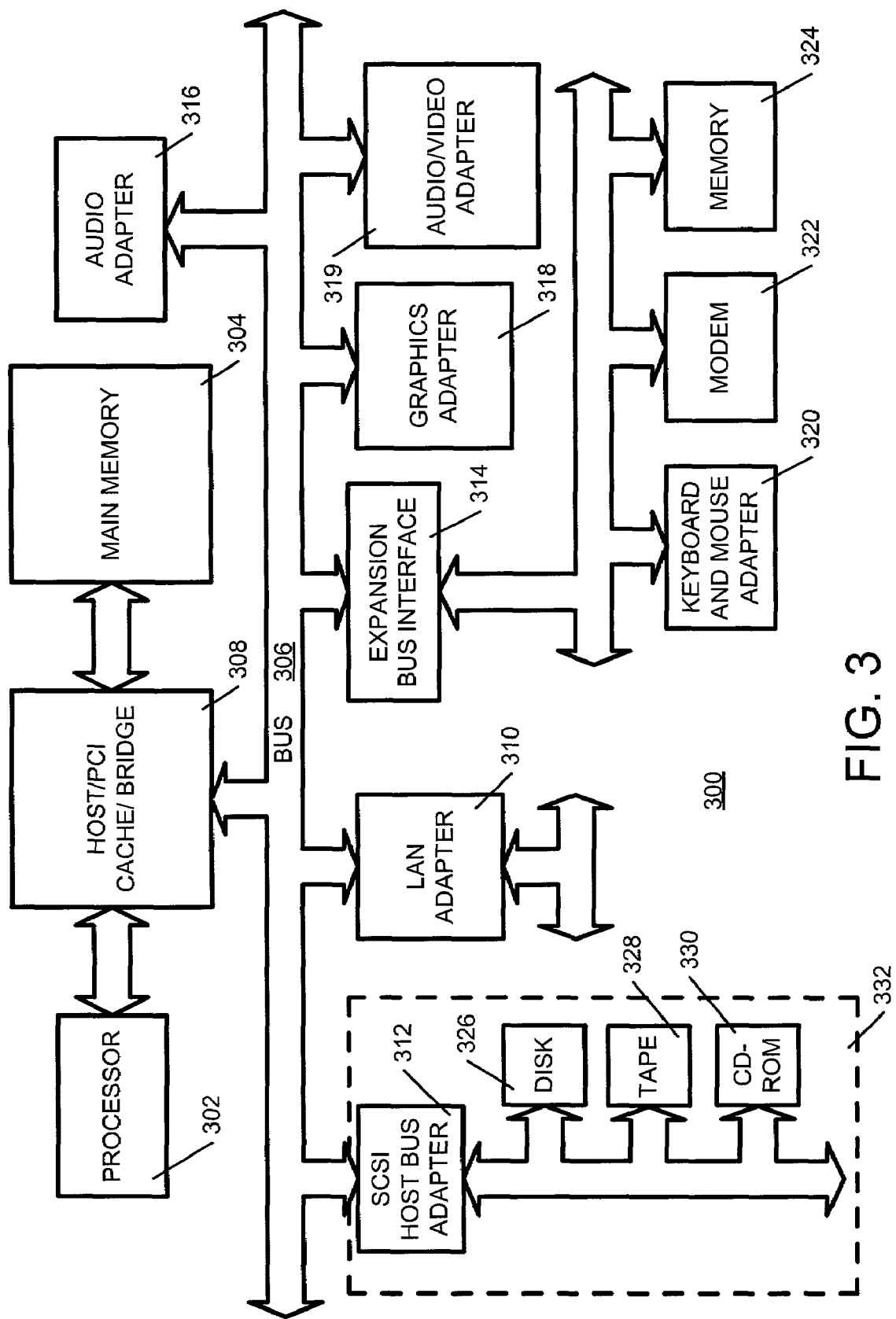
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of highlighting particular sections of a Web document based on a reviewer. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

To better understand the invention, an example will be provided. Suppose an author of a fifty-page document wants to have the document reviewed by several colleagues. Suppose further, that each colleague needs to review only a section of the document, the section regarding the topic with which the colleague is the most familiar. Then the author may design the document such that when it is accessed, buttons are displayed. When a button is asserted a part of the document is highlighted.

Figure 4:
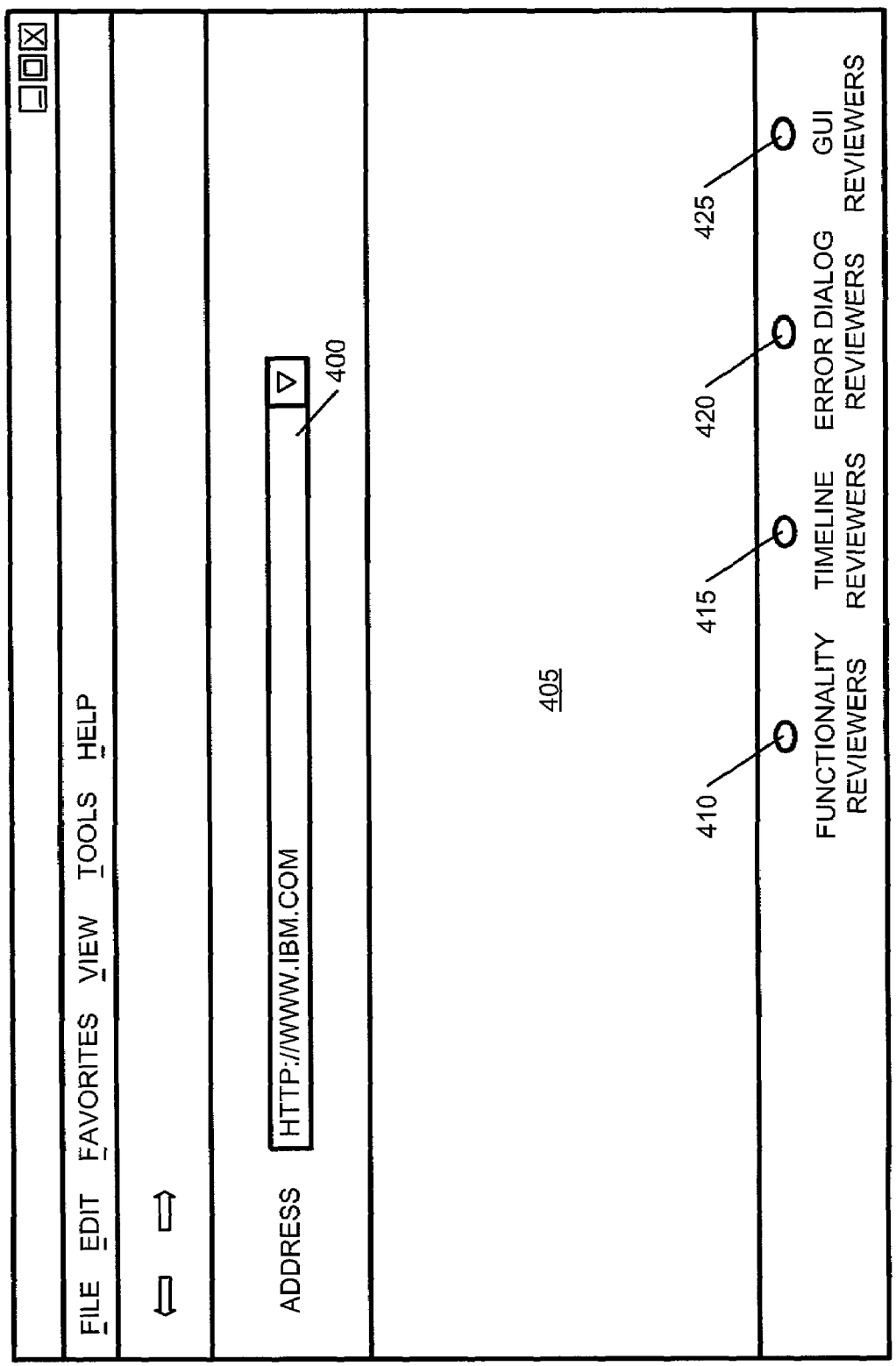
FIG. 4 is a representative graphical user interface (GUI) of a Web browser used by the present invention.

FIG. 4 is a representative graphical user interface (GUI) of a Web browser used by the present invention. Not all items in the GUI are shown and only the items of importance to the invention are given a reference numeral. When a document or Web page is accessed, the content of the page is displayed in area 405 and the address or URL of the page is displayed in address box 400. In this example, four buttons are also displayed at the bottom of the browser. Button 410, labeled functionality reviewers, is to be asserted by the colleague or colleagues who are the most familiar with this topic. When the colleague or colleagues assert button 410, the section in the document relating to this topic is highlighted. Likewise, when button 415 (for time line reviewers), button 420 (for error dialog reviewers) or button 425 (for GUI reviewers) is asserted, the respective section in the document relating to the particular topic will be highlighted.

Note that here, highlighting means any manner that may be used to focus a reviewer's attention to a particular section. For example, the whole document may be grayed out except for the section in question. Or, a different color may be used to display the section in question.

Figure 5A:
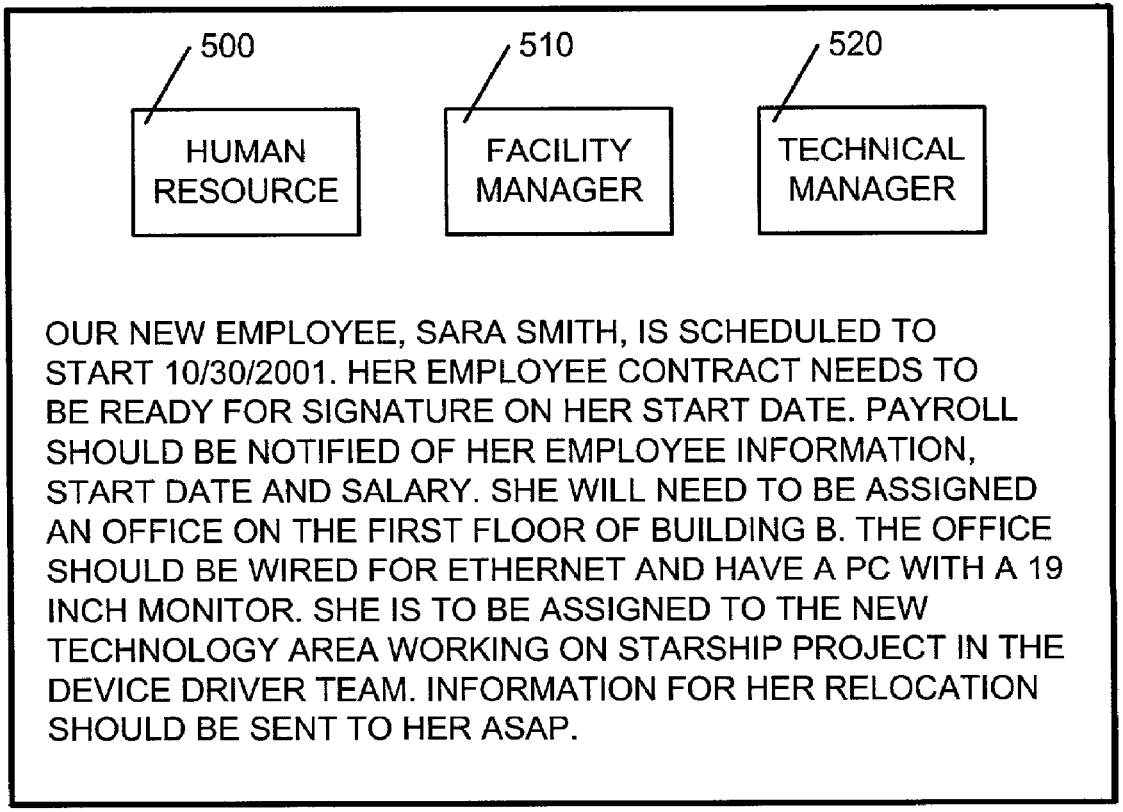
FIG. 5 depicts an example of a Web document that is to be reviewed by different personnel.
Figure 5B:
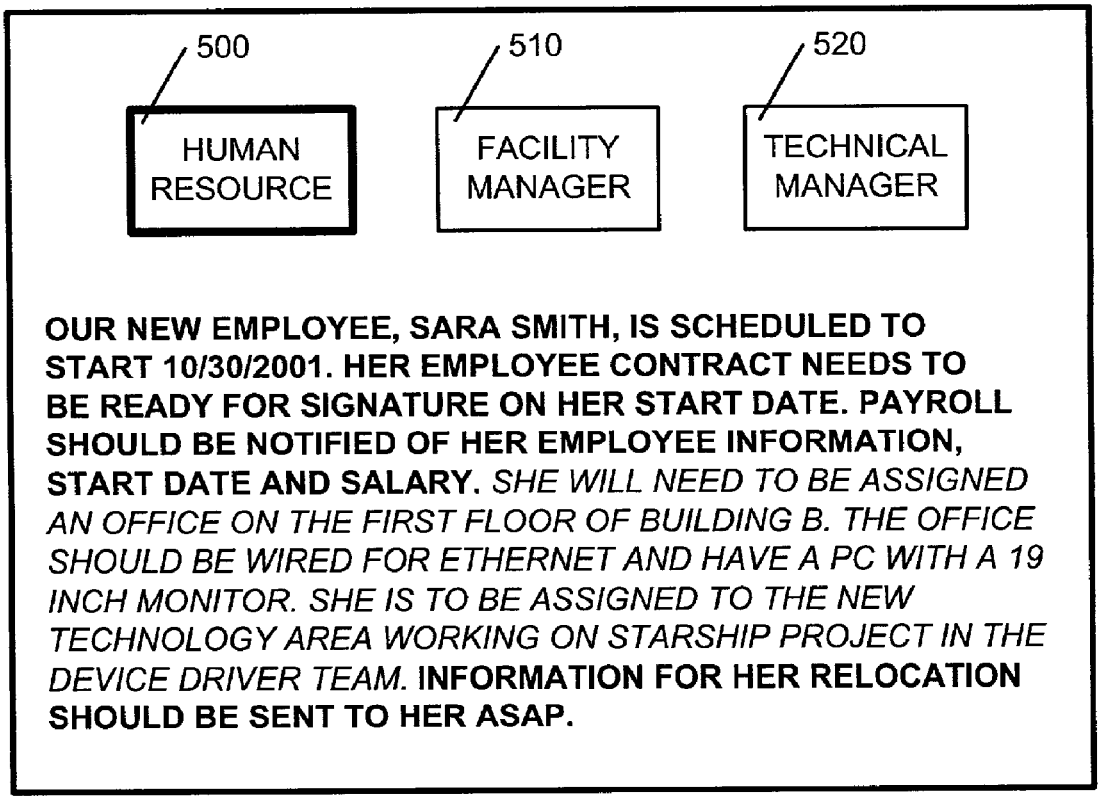
Figure 5C:
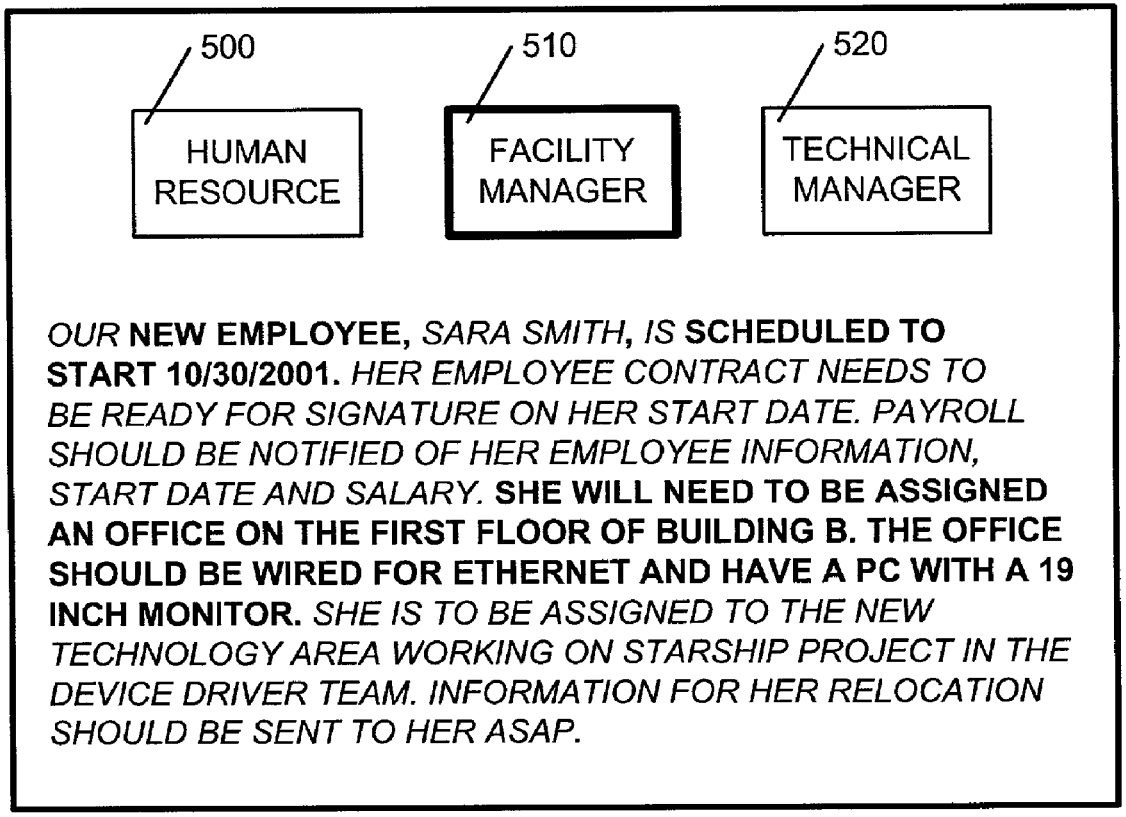
Figure 5D:
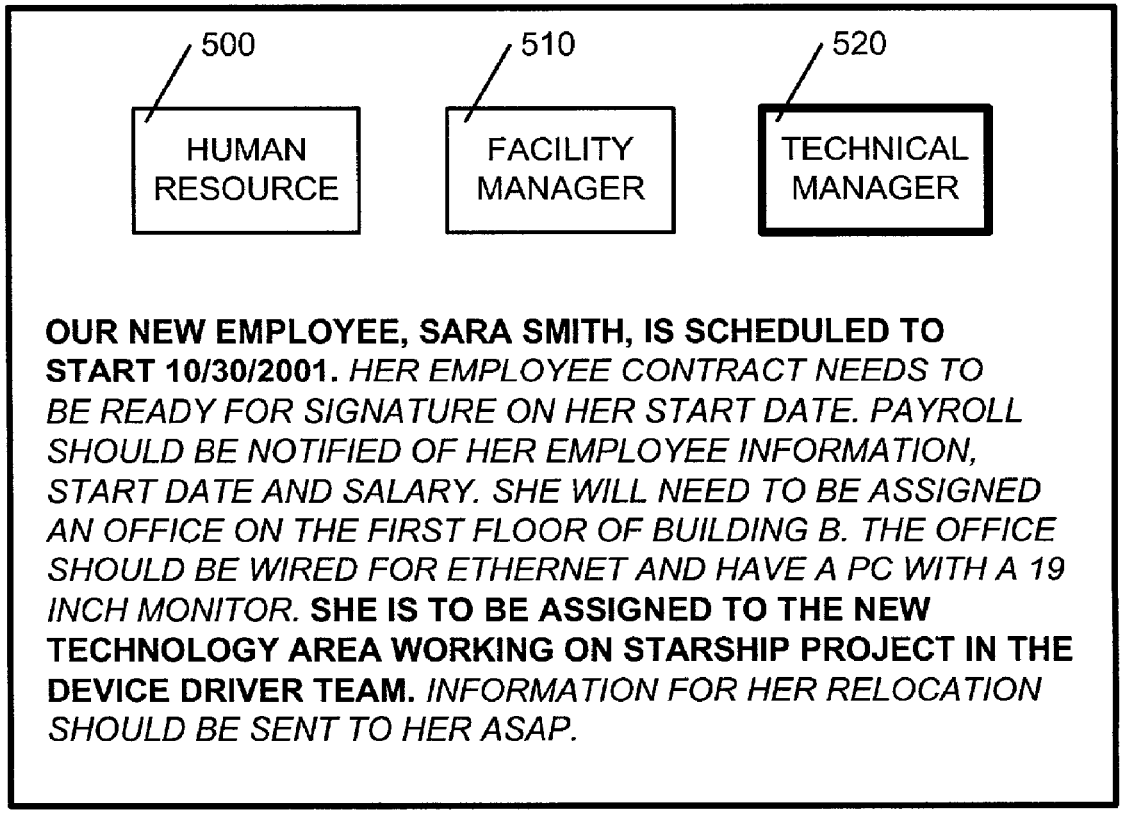

FIGS. 5A, 5B, 5C and 5E depict an example of a Web document that is to be reviewed by different personnel of an organization. If human resource button 500 is asserted, the sections of the document that are to be reviewed by a Human Resource personnel are highlighted (FIG. 5B). If, on the other end, facility manager button 510 is asserted, the sections of the document to be reviewed by a facility manager are instead highlighted (FIG. 5C). Likewise, if Technical Manager button 520 is asserted, the sections of the document to be reviewed by a technical manager are highlighted (FIG. 5D).

As mentioned before, a web page may include links to program code (e.g., Java code) that is to be downloaded and executed on the client computer when the web page is displayed. The downloaded code may be used to create a more interactive presentation, for example, by animating portions of the web page or by prompting for user input. A web page may also include pointers to plug-in modules that are expected to be resident in the client computer. The present invention uses a program (e.g., a JAVA program) to highlight particular sections of the Web page when a user asserts the proper button.

Each section of the document to be reviewed by a particular reviewer will have appropriate tags. For example, preceding the sections to be reviewed by a Human Resource personnel there will be an opening human resource tag identifying the beginning of the sections. Following the sections, there will also be a close human resource tag identifying the end of the sections. When a button is asserted, the tags that the program has to search for will be passed to the program. For example, when the Human Resource button 500 is asserted, Human Resource will be the tag passed to the program. The program then will search the document for the opening human resource tag (i.e., <Human Resource>) and the close human resource tag (i.e., </Human Resource>). Any text within the human resource opening and close tags will be highlighted.

Likewise, when the Facility Manager button 510 or the Technical Manager button 520 is asserted, Facility Manager or Technical Manager will be passed to the program. The program then will search the document for the proper opening tag (i.e., <Facility Manager>or <Technical Manager>) and close tag (i.e., </Facility Manager>or </Technical Manager>) of the tag passed to it when the button was asserted and highlight any text within the tags. FIG. 5E depicts the HTML Web document with the displayed tags.

Note that the tags used in FIG. 5E are for illustration purposes only. Thus, when implemented proper HTML tags will have to be used. In this case, any proper HTML tags may be used to highlight the sections of the document. Of course, if the document is written in XML, the user's own highlighting tags may be used. Obviously, if the document is created using any other markup language, appropriate tags may be found to highlight the sections of the document.

Figure 6:
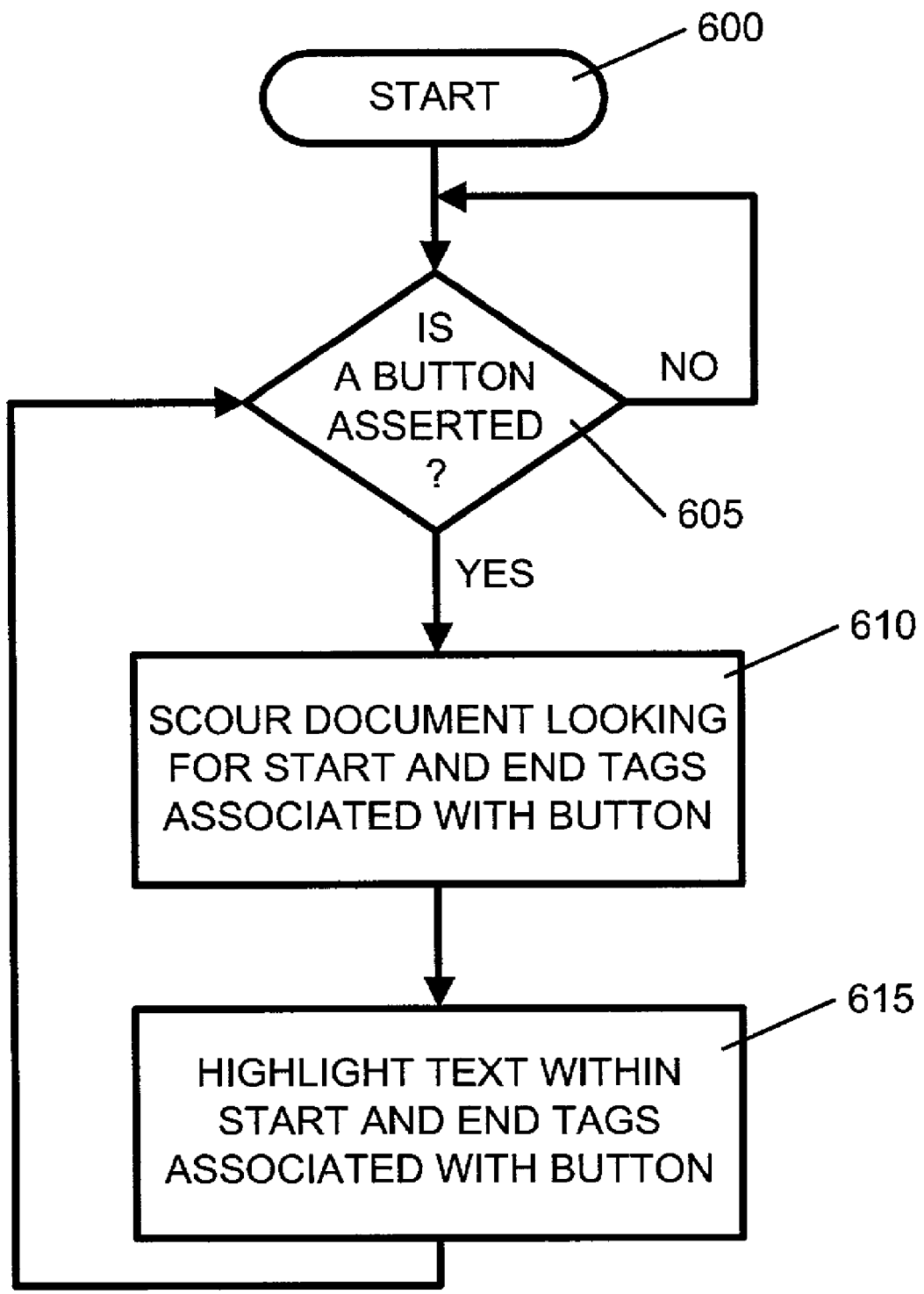
FIG. 6 is a flow diagram of a process used by the invention.

FIG. 6 is a flow diagram of a program (e.g., Java program) that may be used by the invention. The program starts to execute as soon as a document in which the present invention is embedded is accessed (step 600). When the document is accessed, it is displayed including any buttons it may have. When the document is displayed, a check is continuously being made to determine whether any one of the buttons present is asserted. If so, the button passes to the program a tag that the program has to search for. The program then parses the whole document for opening and close tags passed to it by the asserted button (step 610). Text that is within the opening and close tags are then highlighted (step 615).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of displaying a document with a highlighted section based on an intended user comprising the steps of:
   designing the document with a plurality of buttons for selection by users, each button having a label identifying an intended user;
   formatting the document using sets of tags, each set of tags identifying a section of the document and an intended user for whom the section of the document is to be highlighted, each intended user identified by a set of tags corresponding to an intended user identified by a label;
   displaying the document including the plurality of buttons;
   enabling a user to select a button for assertion, the button being selected from the plurality of displayed buttons based on the label of the button;
   obtaining the intended user identified by the label of the selected button in response to the button being asserted;
   parsing the document, using the obtained intended user, for the corresponding intended user identified by the set of tags to determine the section to be highlighted; and
   highlighting the section of the document.

2. The method of claim 1 wherein highlighting the section entails graying out the document except the section.

3. The method of claim 1 wherein highlighting the section entails displaying the section in a different color.

4. A computer program product on a computer readable medium for displaying a document with a highlighted section based on an intended user comprising:
   code means for designing the document with a plurality of buttons for selection by users, each button having a label identifying an intended user;
   code means for formatting the document using sets of tags, each set of tags identifying a section of the document and an intended user for whom the section of the document is to be highlighted, each intended user identified by a set of tags corresponding to an intended user identified by a label;
   code means for displaying the document including the plurality of buttons;
   code means for enabling a user to select a button for assertion, the button being selected from the plurality of displayed buttons based on the label of the button;

code means for obtaining the intended user identified by the label of the selected button in response to the button being asserted;

code means for parsing the document, using the obtained intended user, for the corresponding intended user identified by the set of tags to determine the section to be highlighted; and code means for highlighting the section of the document.

5. The computer program product of claim 4 wherein highlighting the section entails graying out the document except the section.

6. The computer program product of claim 4 wherein highlighting the section entails displaying the section in a different color.

7. An apparatus for displaying a document with a highlighted section based on an intended user comprising:

means for designing the document with a plurality of buttons for selection by users, each button having a label identifying an intended user;

means for formatting the document using sets of tags, each set of tags identifying a section of the document and an intended user for whom the section of the document is to be highlighted, each intended user identified by a set of tags corresponding to an intended user identified by a label;

means for displaying the document including the plurality of buttons;

means for enabling a user to select a button for assertion, the button being selected from the plurality of displayed buttons based on the label of the button;

means for obtaining the intended user identified by the label of the selected button in response to the button being asserted;

means for parsing the document, using the obtained intended user, for the corresponding intended user identified by the set of tags to determine the section to be highlighted; and means for highlighting the section of the document.

8. The apparatus of claim 7 wherein highlighting the section entails graying out the document except the section.

9. The apparatus of claim 7 wherein highlighting the section entails displaying the section in a different color.

10. A computer system for displaying a document with a highlighted section based on an intended user comprising:

at least one memory device for storing code data; and at least one processor for processing the code data to design the document with a plurality of buttons for selection by users, each button having a label identifying an intended user, to format the document using sets of tags, each set of tags identifying a section of the document and an intended user for whom the section of the document is to be highlighted, each intended user identified by a set of tags corresponding to an intended user identified by a label, to display the document including the plurality of buttons, to enable a user to select a button for assertion, the button being selected from the plurality of displayed buttons based on the label of the button, to obtain the intended user identified by the label of the selected button in response to the button being asserted, to parse the document, using the obtained intended user, for the corresponding intended user identified by the set of tags to determine the section to be highlighted, and to highlight the section of the document.

11. The computer system of claim 10 wherein highlighting the section entails graying out the document except the section.

12. The computer system of claim 10 wherein highlighting the section entails displaying the section in a different color.

* * * * *